June 8, 1926.

H. RESCH 1,587,989

COMBINED TYPEWRITING AND COMPUTING MACHINE

Filed Sept. 5, 1923    4 Sheets-Sheet 1

June 8, 1926.

H. RESCH 1,587,989

COMBINED TYPEWRITING AND COMPUTING MACHINE

Filed Sept. 5, 1923 4 Sheets-Sheet 2

Fig. 3.

Inventor:
Henry Resch
by B. C. Stickney
Attorney

June 8, 1926.

H. RESCH 1,587,989

COMBINED TYPEWRITING AND COMPUTING MACHINE

Filed Sept. 5, 1923    4 Sheets-Sheet 3

Inventor:
Henry Resch
B.C. Stickney
Attorney

June 8, 1926.

H. RESCH 1,587,989

COMBINED TYPEWRITING AND COMPUTING MACHINE

Filed Sept. 5, 1923    4 Sheets-Sheet 4

Inventor
Henry Resch
by B. C. Stickney
Attorney

Patented June 8, 1926.

1,587,989

UNITED STATES PATENT OFFICE.

HENRY RESCH, OF BAYONNE, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

Application filed September 5, 1923. Serial No. 661,014.

This invention relates to combined typewriting and computing machines, and is herein illustrated as applied to an Underwood bookkeeping machine such as disclosed in the patent to Adolph G. Kupetz, No. 1,452,162, dated April 17, 1923.

In using the machine disclosed in said patent, debits are typed in one column in one color, usually black, and run additively into a register; credits are typed in another column in a second color, usually red, and run subtractively into the register; and the result is typed in a third or balance column and run into the register in such a manner as to clear the same. Usually the balance is a debit balance and is typed in the first color, or black, and subtracted from the result in the register, thereby clearing the latter. When, however, the result of a computation is a credit balance, this result is typed in red in the balance column and run additively into the register to clear the same. In such machines, upon entrance of the carriage into the balance zone, the machine is automatically set to subtract and to print in the first color, or black. When, however, the reading of the register indicates a negative result or credit balance, a credit-balance key is depressed to reset the machine to add and to type in red.

When the dial-wheel of highest order stands at "9", the existence of a credit balance is indicated. If the negative result is one well within the capacity of the register, as is usually the case, there will be a succession of "9"'s. The typist therefore becomes accustomed to looking for a series of "9"'s. Sometimes, however, there may be a series of "9"'s shown, but the dial-wheel of highest order may stand at "0". In such cases the typist is frequently misled into concluding that the balance is a credit balance, and into erroneously operating the credit-balance key.

According to the present invention, provision is made of indicating means by which such mistakes may be avoided. To this end provision is made of a signal bearing the inscription "credit balance," and of controlling means therefor by which the signal is normally held in concealed position but is brought into view at the sight-opening when a credit balance is obtained in the register, and is displayed with each successive reading until the character of the result is changed. Such control of the register may be effected by means of the carry-over tooth of the dial-wheel of highest order.

In a machine such as disclosed in said patent, it is also necessary, after observing the credit-balance character of the result, to actuate a credit-balance key to set the machine to red subtraction. Upon typing this credit balance, obtained by taking the complement to the base 9 of the digits displayed on the dial-wheels, down to that of lowest order, and taking the complement of that digit to the base 10, and actuating the general operator, the register is cleared.

Another feature of the invention consists in the provision of means to avoid errors, which might arise from failure to operate the credit-balance key at the proper time. To this end, provision may be made of means for automatically setting the machine to effect red addition in the balance zone when the register contains a credit balance. In obtaining this result, the register, when it contains a credit balance, sets certain parts of the machine, so that, as the carriage enters the balance zone, the ribbon-shifting mechanism is operated to render the red field of the ribbon effective, and the computing mechanism is set for addition. At the same time a locking device is rendered effective for preventing automatic operation of the subtraction-setting mechanism.

According to the present embodiment of the invention, the dogs through which the subtraction-setting mechanism is operated, and the control of the color-changing mechanism is determined, are so constructed and mounted as to be actuable by the carriage only when moving in letter-feeding direction, whereas the dog for effecting actuation of the general operator is so constructed and mounted as to be actuable by the carriage when it moves out of a computing zone in letter-feeding direction, or when it is backed into such a zone.

Normally the use of an addition-stop will cause black addition in the corresponding zone; the use of a subtraction-stop will cause red subtraction in the corresponding zone; and the use of one of the special subtraction-stops will cause either black subtraction or red addition in the corresponding zone, in accordance, respectively, with the positive or negative result in the "balance" register. The color of typing and the state of computation in such zones may, however, be varied to a considerable extent by appropriate use of a subtraction-key and a credit-balance key.

Other features and advantages will hereinafter appear.

In the accompanying drawings:—

Upon depression of alphabet-keys 20 or numeral-keys 21, the corresponding key-levers 22 act through the usual bell-cranks 23 to swing type-bars 24 upwardly and rearwardly to cause types 25 thereon to strike against a platen 26. The platen 26 is journaled by means of an axle 27 in the ends of the carriage 28 mounted for movement transversely of the machine on front and rear rails 29 and 30, respectively.

The carriage 28 is normally urged to the left by a spring-drum, not shown, and is controlled in its movement to the left by means of a rack 31 pivotally supported on the carriage 28, and normally meshing with a pinion 32, having a usual one-way connection with an escapement wheel 33. The escapement wheel 33 is normally held against movement by a loose dog 34 mounted on a pivoted dog-rocker 35. When, however, a type-bar 24 approaches the end of its typing movement, a heel 36 thereon strikes a curved bar 37 forming part of a universal frame 38 supported at its rear on pivoted arms 39, and swings the upper end of the dog-rocker 35 rearwardly to carry the loose dog 34 out of engagement with the escapement wheel 33 and to bring a fixed dog 40 on the dog-rocker 35 into engagement with the escapement wheel 33. Upon the return movement of the actuated type-bar, the universal frame 38 is returned in the usual manner, and the loose dog 34 is again brought into engagement with the escapement wheel, thereby permitting the escapement wheel to advance one step in the usual manner.

The typing is effected through a ribbon 41 threaded through the upper end of a ribbon-vibrator 42, pivotally connected at its lower end with the forward end of a curved lever 43 mounted to swing about a pivot 44, and provided at its upwardly-extending rear end with oppositely-extending pins 45 and 46 to engage in slotted ends 47 of a frame 48, slidable laterally on the universal frame 38. When the frame 48 is in its left-hand position, the pin 46 extending to the left engages in the corresponding slotted end 47, and, upon rearward motion of the universal frame 38, the ribbon 41 is lifted to bring an upper or black field 49 into position to be struck by the type. When, however, the frame 48 is moved to the right, the pin 45 extending to the left of the lever 43 engages the corresponding slotted end 47, and, upon rearward movement of the universal frame 38, the ribbon 41 is lifted to bring a lower or red field 50 into effective position.

Projecting rearwardly from the carriage 28 are arms 51 carrying a toothed bar 52 to receive column-stops 53 to co-operate with counter-stops 54 shiftable into the paths of the column-stops 53 by means including tabulator-keys 55. Also supported on said arms 51 are plates or brackets 56, to which are secured a rod 57, on which denomination-selectors 58 are mounted for swinging and sliding movement, and a rod 59 having notches to receive teeth 60 on said denomination-selectors to hold the latter in adjusted letter-space positions.

Normally the denomination-selectors are in depressed position, but, upon movement of the carriage into a computing zone, a roll 61 on the corresponding denomination-selector rides up on the end of a zone-controller 62, journaled in arms 63, which, when desired, may be swung rearwardly in the usual manner to throw the denominationselecting mechanism out of operation. When the denomination-selector is in its raised position, a dog or tappet 64 thereon is supported in raised position, so that, as the carriage passes through the computing zone, it engages and actuates seriatim jacks 65 and swings the latter about their pivot 66. This movement of the jacks 65 is transmitted through rods or links 67 and levers 68 to transposition linkages 69, which, in turn, by means of bell-cranks 70 engaging pins 71 on denominational members 72, advance the latter seriatim to bring index-pins 73 thereon beneath pin-setting bars 74 actuable by the numeral-keys.

Upon depression of each numeral-key, a pendant or link 75, pivotally connecting with the corresponding key-lever 22, engages an arm 76 on a shaft 77 of a series corresponding to the keys bearing significant digits, and rocks the shaft, such movement being transmitted by an arm 78 on said shaft to a bar 79, forming with one of the pin-setting bars 74 a pin-setting linkage. As the denominational members 72 are advanced one by one, the digits are indexed separately on said denominational members.

When the indexing of a number is completed, the general operator 80 is advanced to cause a cross-bar 81 thereon to engage the lower ends of the depressed pins 73 and advance the denominational members distances corresponding to the values of the digits indexed, such motion being transmitted by the usual one-way connection to dials or number-wheels 82, forming part of a register indicated in general by 83, the results being read through a sight-opening 84 in the computer-casing 85. The general operator and the denominational members 72 are then returned to their normal positions, the depressed pins 73 being restored to their normal positions by a restoring platform 86 in the usual manner.

Figures 1, 2:
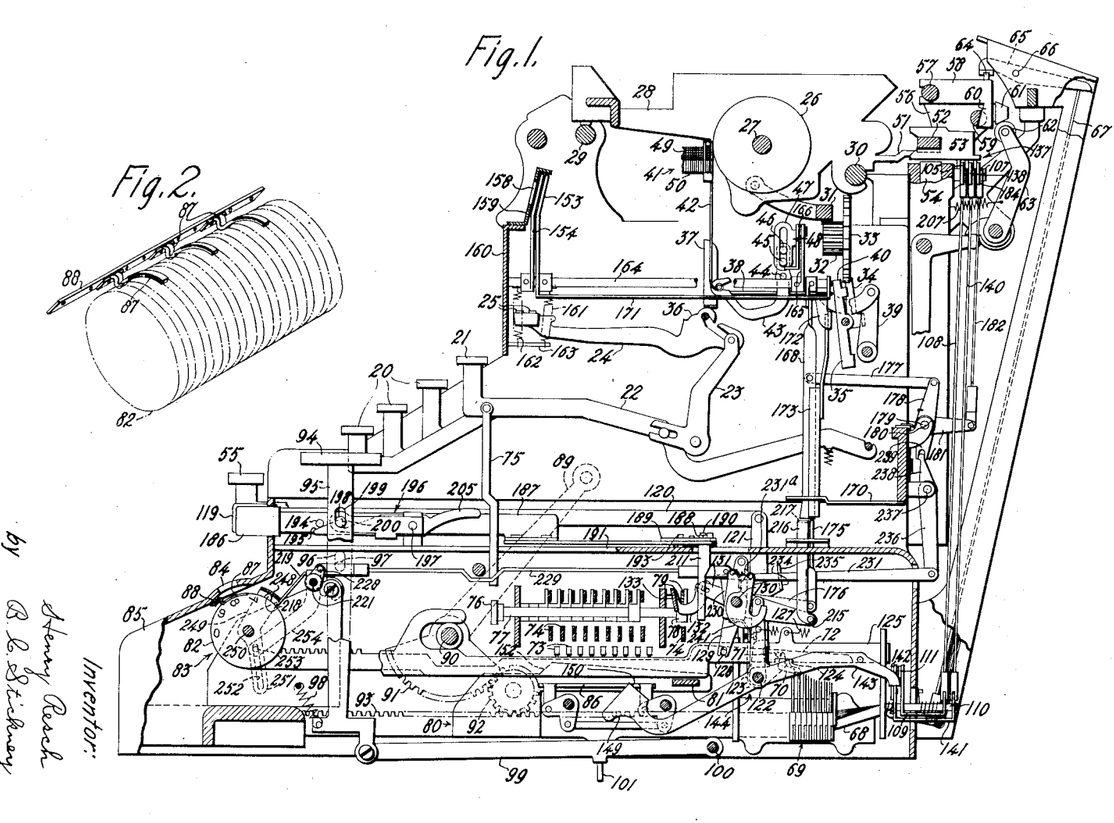
Figure 1 is a diagrammatic side elevation, partly in section, showing the invention applied to an Underwood bookkeeping machine.
Figure 2 is a detail perspective view of the punctuation-fingers and the plate by which they are attached to the computer-casing, adjacent the front edge of the sight-opening.

For convenience in reading results from the register provision is made of punctuation-fingers 87, attached to a bar 88, which is secured to the casing 85 at the inner face thereof and adjacent the lower edge of the sight-opening 84. As shown in Figure 2, these fingers 87 are so bent as to lie between adjacent dial-wheels 82, and the bar 88 is attached to the casing 85 adjacent the forward edge of the sight-opening.

Reciprocation of the general operator may be effected by a handle 89 mounted on a shaft 90, having fixed thereon toothed sectors 91, which, in turn, are connected by pinions 92 with racks 93 forming part of the general operator 80. Usually, however, reciprocation of the general operator is effected by power means and the handle 89 is removed from the machine. To throw into action the power-operated means for reciprocating the general operator, use is made of a key 94 mounted on the upper end of a plunger 95 having a guide-slot 96, into which projects a pin 97 projecting from a fixed part of the computer. The key 94 is normally held in raised position by a spring 98 connected at one end to a fixed part of the computer and at the other end to the lower end of the plunger 95, which is pivoted to the forward end of a lever 99, mounted at its rear end on a pivot 100 and overlying the right-hand end of a transverse lever 101 of the first order. At its left-hand end the lever 101 has an operative connection with a clutch-controlling pin 102. Upon depression of the key 94, the pin 102 is lifted from the path of a clutch-controlling member 103, and the general operator is then actuated through one complete cycle, as brought out more fully in said patent to Kupetz.

Usually the general operator is actuated after the carriage has passed through a computing zone and a number to be run into the register has been indexed on the pins 73. Actuation at such a time may be effected automatically by means of a corresponding column-stop 53. To this end, each column-stop is provided with a downward projection 104, which, when the carriage is fed out of a computing zone, engages a dog 105 mounted on a trip-lever 106 and swings the latter about a pivot 107. Such movement of the lever 106 is transmitted through a link 108 and a bell-crank 109 mounted on a pivot 110 to a latch-member 111 to withdraw the latter from the path of a rearwardly-extending arm 112 of a lever 113, thereby permitting the lever 113 to be swung about its pivot 114 by means of a spring 115. In the movement of the lever 113 by the spring 115, its forwardly-extending arm 116 engages a pin 117 on a vertical slide 118 and depresses the right-hand end of the lever 101, thereby causing a complete reciprocation of the general operator in the same manner as by depression of the key 94.

As herein disclosed, the computing mechanism, although normally set for addition, may be set to effect subtraction by the complemental method. Such setting for subtraction may be effected by means of a subtraction-key 119 connected with a rearwardly-extending link 120, pivoted to the upper end of an arm 121, fixed on a transverse shaft 122, having thereon a hook 123, normally held in a notch 124 of a subtraction-setting bar 125 by means of a spring 126 connected at its rear end to the arm 121. Upon depression of the key 119, the hook 123 is withdrawn from the notch 124 and the subtraction-bar 125 is moved rearwardly by a spring 127, the forward end of which is attached to said bar 125.

A pin 128 on the subtraction-bar 125 projects through the slotted lower end of an arm 129 fixed on a shaft 130, so that, in the rearward movement of the subtraction-bar 125, the shaft 130 is rocked in a counter-clockwise direction, as seen in Figure 1, thereby acting through an arm 131 fixed thereon and having a pin-and-slot connection with an arm 132 fixed on a bar 133 to swing the latter about pivots near the upper edge thereof to advance the shafts 77 to change the connection between said shafts and the upper bars 79 of the pin-setting linkages, the connection between the bar 133 and shafts 77 being effected by a projection of the lower edge of the bar 133 into grooves or notches in said shafts. Concomitantly with the shifting of connections between the shafts 77 and the pin-setting linkages, all of the "9" pins are set in the usual manner by means not shown.

Figure 3:
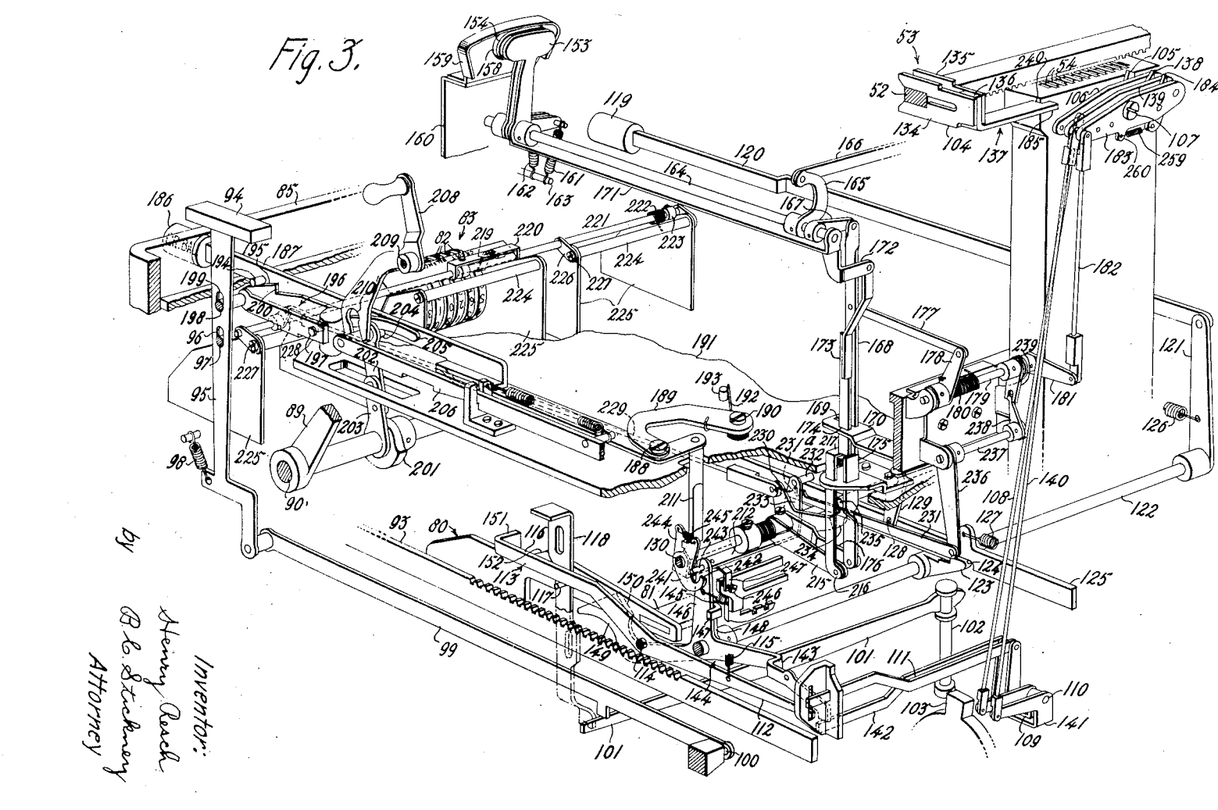
Figure 3 is a skeleton perspective view of the machine.

Subtraction-setting may also be effected automatically by the carriage, use being made of a column-stop 53 for this purpose. As shown in Figure 3, each column-stop 53 is formed of two parallel plates, a right-hand plate 134, which carries the projection 104, and a left-hand plate 135. Fixed between the rear ends of these plates 134 and 135 is an upwardly-extending end 136 of a member 137 extending to the left near the lower edges of the plates 134 and 135.

As the carriage 28 enters the computing zone in connection with which such a column-stop is used, the horizontally-extending bracket or member 137 engages a dog or tappet 138 carried by a lever 139, and rocks the latter about the pivot 107, thereby lifting a link 140 connected at its lower end with a bell-crank 141. Such upward movement of the link 140 acts through the bell-crank 141 to withdraw a latch-member 142 from the path of a rearwardly-extending arm 143 of a three-armed lever 144, thereby permitting the lever 144 to be swung in a clockwise direction (Figure 3) by means of a spring 145. The lever 144 is loosely mounted on the shaft 122, but the rear edge of the upwardly-extending arm 146 of the lever is normally in engagement with a lug 147 projecting from the upper end of an arm 148 fixed on the shaft 122. Upon movement of the lever 144 by the spring 145, the shaft 122 is rocked in the same manner as by subtraction-key 119 and the machine set for subtraction, the connection between the lever 144 and the shaft 122 being, however, such that rocking of the shaft 122 may be effected by the subtraction-key 119 entirely independently of the lever 144.

At its forward end the forwardly-extending arm 149 of the lever 144 is provided with an inclined edge 150 to be engaged by the cross-bar 81 of the general operator in its forward movement to restore the lever 144 to its normal position, to permit the latch-member 142 to be thrust beneath the rearwardly-extending arm 143 thereof. It should also be noted that, in the forward movement of the general operator, a lateral extension 151 on the forward end of the lever 113 is engaged by an incline 152 on the general operator and the lever 113 restored to its normal position with its rearwardly-extending arm 112 beneath the latch-member 111.

Provision is made at the front of the machine of a state-signal 153 having an "A" and an "S" thereon to indicate the state of the computing mechanism, and a color-signal 154 having a black color field 155 and a red color field 156, each of which has an opening 157 therein to permit either the "A" or the "S" of the state-signal to be observed therethrough at a sight-opening 158 in a shield 159 secured to a front plate 160 of the machine. Normally the state-signal and the color-signal are held in their left-hand positions by means of springs 161 and 162, respectively connected thereto and to a pin 163 projecting rearwardly from the plate 160, the "A" of the state-signal being at this time seen through the opening in the black field, so that the showing at the sight-opening 158 indicates the machine as set for typing in black and adding.

The color-signal 154 is fixed on a rearwardly-extending shaft 164, connected with the color-changing frame 48 on the universal frame 38 by means of an upright arm 165 fixed on the shaft 164, and connected with the frame 48 by means of a link 166. Fixed on the rear end of the shaft 164 is a leftwardly-extending arm 167 having pivotally connected thereto a pendant or link 168 extending through a slot 169 in a bracket 170 attached to a fixed part of the frame. It should be noted that slot 169 is of sufficient length to permit the lower end of the link 168 to be shifted forwardly from its normal position.

The state-signal 153 is connected by a bail 171, rotatable about the shaft 164, with a leftwardly-extending arm 172, from which depends a link 173 passing through a slot 174 in the bracket 170 adjacent the slot 169. Immediately beneath the links 168 and 173 is the upper end of a plunger 175 connected at its lower end with the rear end of an arm 176 fixed on the shaft 130. Upon setting the machine for subtraction, the plunger 175 ordinarily lifts both of the links 168 and 173 and sets the state and color signals, so that red subtraction is indicated at the sight-opening 158.

In certain cases, however, it is desired to print in black in connection with a subtraction operation, and for this purpose provision is made of means to swing the lower end of the link 168 forwardly in the slot 169 out of the path of the plunger 175. To this end the link 168 is connected by a horizontal link 177 with an arm 178 fixed on a rock-shaft 179 urged by a spring 180 in a direction to maintain the link 168 in its rearward position over the plunger 175. Also fixed on the shaft 179 is a rearwardly-extending arm 181 pivotally connected to the lower end of the link 182, connected at its upper end with a lever 183 mounted on the pivot 107 and provided with a dog or tappet 184 to be engaged by an extension 185 on a member 137 connected to one of the column-stops 53. Upon rocking of the levers 183 by the projection 185, the link 168 of the color-changing mechanism is swung forwardly out of the path of the plunger 175.

When the machine is set for black subtraction in a balance zone, the machine may be set for red addition by depressing a credit-balance key 186 on the forward end of a link 187 connected at its rear end by a shouldered screw 188 with a curved lever 189 pivoted by means of a shouldered screw 190 to a top plate or ceiling 191 of the computer-casing 85. The key 186 is normally held in its forward position by means of a spring 192 having one end in engagement with a pin 193 in the plate 191 and the other in engagement with the lever 189. During the rearward movement of the key 186, a pin 194 on the link 187 engages a cam 195 on a frame 196 and swings the latter downwardly about a fixed pivot 197. In such swinging movement, a pin 198, projecting from the frame 196 into a slot 199 in the plunger 95, acts to depress the latter to cause the general operator to function, thus resetting the machine for addition. When the pin 194 passes to the rear of the cam 195, the frame 196 is released and the plunger 95 is returned to its normal position by means of the spring 98. The pin 194 is then locked in its rearward position by means of a shoulder 200 at the rear end of the cam 195.

During the movement of the general operator, a cam 201 on shaft 90 engages the lower end of a bar 202, slidably mounted upon an arm 203 on the shaft 90, and lifts the bar 202 to cause a pin 204 at the upper end of the bar to lift a rearwardly-extending arm 205 of the frame 196 to release the pin 194 from control by the shoulder 200. It will be understood that the credit-balance key 186 should be held in such position until one complete reciprocation of the general operator has been effected, so that at the end of such reciprocation the credit-balance key will be locked in rearward position.

The pin 204 is also connected with a non-compute link 206 connected in the usual manner with the arms 63 to shift the zone-controller 62 rearwardly against the action of a spring 207. Actuation of the link 206 is effected by means of a non-compute lever 208 mounted on a fixed pivot 209 and provided at its lower end with a slot 210 to receive the pin 204 and permit upward and downward movement thereof.

The mechanism so far described is substantially the same as that disclosed in said Kupetz patent. In the machine herein disclosed, actuation of the credit-balance key effects a shifting of the color-controlling mechanism, but the means for effecting this result is substantially different from that shown in said patent.

At its rear end, the link 187 is provided with a downwardly-extending rod or member 211, which, upon depression of the credit-balance key 186, strikes a bail 212 and swings the latter about the shaft 130 against the action of a spring 213 coiled around the shaft 130 and connected at one end with a collar 214 fixed on the shaft and at the other end with an arm 215 mounted on shaft 130 and in engagement with the bail 212. Such actuation of the bail 212 causes an upward swinging of the arm 215 and a consequent upward movement of a plunger 216 to cause the laterally-offset head 217 thereof to lift the link 168 to cause typing in red. In this connection, it should be noted that the lower end of link 168 normally overlies both of the plungers 175 and 216.

Usually the credit-balance key is actuated to set the machine for red addition in a zone in which the machine has been automatically set for black subtraction and is used only when a negative result is indicated in the register by the display of "9" on the dial-wheel of highest order. According to the present invention, provision is made of means rendered effective by such position of the dial-wheel of highest order to lock the automatic subtraction-setting mechanism out of operation and to set other parts so that, upon approach of the carriage to such computing zone, the color will be automatically changed to red.

It should be understood that, as in said Kupetz patent, three forms of column-stops may be used, an addition-stop, an ordinary subtraction-stop, and a special subtraction-stop having means to relieve the color-changing mechanism from control by the subtraction-setting mechanism. The last-mentioned form of column-stop is usually effective to set the machine automatically for black subtraction, and the resetting of the machine ordinarily occurs only in a zone corresponding to such a column-stop. When the dial-wheel 82 of highest order moves to a position to display "9" thereon at the sight-opening 84, a carry-over tooth 218 engages the end of an arm 219 secured to a bail 220 and rocks the same and a shaft 221 on which the bail is fixed, such rocking being resisted by a spring 222 secured at one end to a collar 223 fixed on the shaft 221, and engaging at the other end a rod 224 supported in two plates 225, which may be register end plates.

The shaft 221 rests upon a series of plates 225, including those just mentioned, and is secured in position on said plates by means of straps 226 embracing the shaft 221 and secured at their other ends by screws 227 which also serve to hold the rods 224 in place on the plates 225. Such rocking movement of the shaft 221 is transmitted by an arm 228 fixed thereon to a rearwardly-extending link 229 connected at its rear end with a bell-crank 230, which serves to lift the forward end of a link 231 to effect an operative connection between a yoke 231ᵃ at the forward end of link 231 and a pin 232 on an arm 233 extending upwardly from the left-hand end of the bail 212.

The forward end of link 231 is supported on a lateral projection 234 at the rear end of the bell-crank 230, and is held against excessive lateral movement by a finger 235, to the left thereof, on the projection 234, and by the arm 233 which is at the right thereof. At its rear end the link 231 is pivoted to the lower end of an arm 236, fixed on a rock-shaft 237, which is operatively connected with the rock-shaft 179 by an upwardly-extending arm 238, fixed on the shaft 237, and having a rounded end projecting into a fork at the lower end of an arm 239, fixed on the rock-shaft 179.

Upon approach of the carriage to the computing zone, corresponding to the column-stop 53 shown in Figure 3, the projection 185 engages the dog 184 and rocks the lever 183. Such motion is transmitted to the rock-shaft 179, and, through members 178 and 177, to the link 168, to shift the same out of the path of the plunger 175. Such movement of the rock-shaft 179 is also transmitted to the link 231, to rock the bail 212, and thereby lift the plunger 216, to engage the link 168 and shift the color-signal 154, to show red at the sight-opening.

Inasmuch, however, as the balance is a credit balance, as indicated by the register, it is not desired to set the computing mechanism for subtraction as would ordinarily be effected by engagement of a shoulder 240, on the member 137, with the dog or tappet 138. Such subtraction-setting is effected by release of the lever 144 from control by the latch 142, and such automatic setting may be prevented by locking this lever 144 against such movement. To this end, provision is made of a member 241, pivoted on shaft 130, at the right of bail 212, and provided with a finger 242, to be swung to the rear of a pin 243 on the upwardly-extending arm 146 of the lever 144. Under certain conditions, the pin 243 may overlie the finger 242 before the rocking of the bail 212 is effected. The connection between the bail 212 and member 241 is therefore so constructed as to yield when such conditions arise. To this end, the right-hand arm of the bail 212 is provided with an upward extension 244, which is connected by a spring 245 with the upper end of member 241, the members 241 and 242 being provided with suitable abutments to limit their movement towards each other.

It should be noted that the bail 212 is normally held in proper position by an adjusting screw 246, in contact with a fixed part of the frame, threaded into a bracket 247 fixed on the bail 212.

Figures 4, 6, 7, 8:
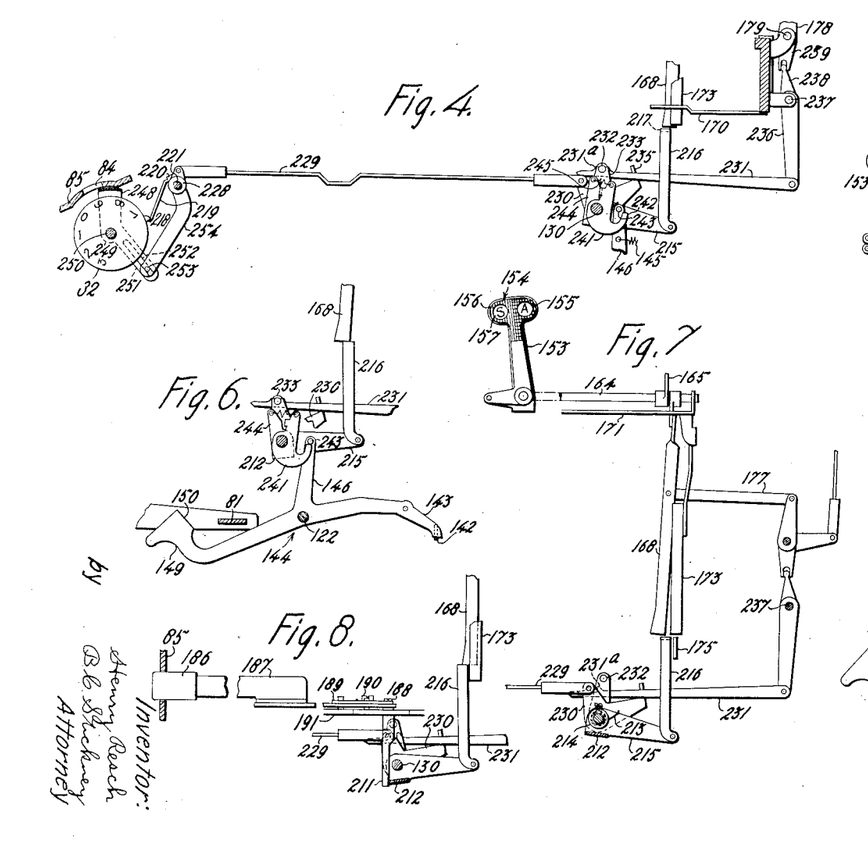
Figure 4 is a view showing the positions assumed by certain parts when a credit balance is to be typed in the balance-column.
Figure 6 is a view similar to Figure 5, but showing the parts in the positions assumed when the automatic subtraction-setting mechanism has been operated before such actuation of the parts as in Figure 5.
Figure 7 shows the positions assumed by the different parts prior to entering a balance-zone when a debit balance is shown on the register.
Figure 8 is a view showing the positions of the parts resulting from an actuation of the credit-balance key when the color-changing link is in its normal position.
Figure 5:
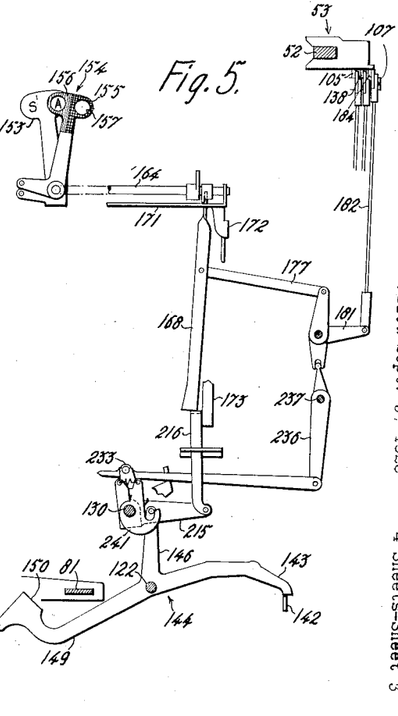
Figure 5 is a view showing the parts in the positions assumed when actuated by the carriage, after being set as shown in Figure 4.

As hereinbefore stated, the typist may be misled by seeing a succession of "9"'s in the left-hand part of the register, even though the dial-wheel of highest denomination is not set at "9". To avoid errors arising from this condition, provision is made of a signal 248, having thereon the inscription "credit balance". This signal is carried by arms 249, mounted to swing about a rod 250, on which the dial-wheels 82 are rotatably mounted, and may be swung from its concealed position, Figures 1, 9 and 10, to its exposed position, Figures 4 and 11. To this end, one of the arms 249 is provided with an extension 251, provided with a slot 252, to receive a pin 253 on an extension 254 of one arm of the bail 220. When, therefore, the bail 220 is shifted to its Figure 4 position, the signal 248 is displayed at the sight-opening 84. As shown in Figures 1 and 2, the signal 248 and the punctuation-fingers 87 is avoided by supporting the latter on the inside of the casing 85 along a line to the front of said sight-opening.

Figures 9, 10, 11, 12, 13:
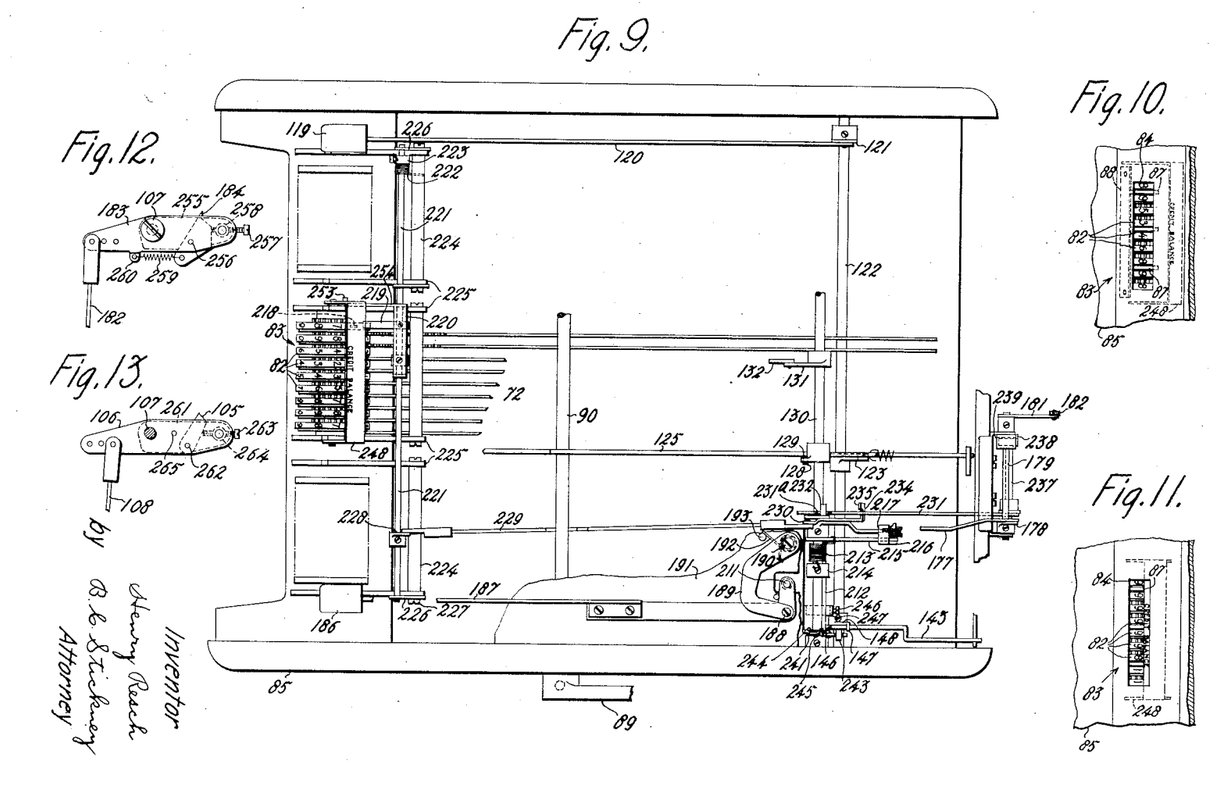
Figure 9 is a fragmentary view of the computing mechanism as seen from above.
Figure 10 is a view of the register with the signal in concealed position, as indicated in dotted lines.
Figure 11 is a view of the register with the credit-balance signal in exposed position.
Figure 12 is a detail view of one form of trip-device actuable by the carriage.
Figure 13 is a detail view of another form of trip-device actuable by the carriage.

As shown in Figure 12, the trip-lever 183 has associated therewith a plate 255, between which and the lever 183 is located the dog 184, mounted to swing about a pivot 256, and supported against movement in a letter-feeding direction by a stop in the form of an adjusting screw 257, threaded through a stud 258. The dog 184 is yieldably urged toward the stop or screw 257 by means of a spring 259, connected at one end with the lower end of the dog and at the other end with an ear 260. The lever 139 and dog 138 are constructed and arranged in substantially the same manner as lever 183 and dog 184.

The trip-device for the general operator is, however, constructed and arranged for operation by the carriage in either direction of movement thereof. Associated with the lever 106 is a plate 261, between which and the lever 106 is located the dog 105, mounted to swing about a pivot 262, and limited against movement in a letter-feeding direction by a stop or adjusting screw 263, threaded through a stud 264, and in the opposite direction by means of a pin 265. It will be evident from the showing in Figure 13 that the lever 106 will be actuated by a stop 53, irrespective of the direction in which the stop moves to engage the dog 105.

Variations may be resorted to within the scope of the invention, and portions of the improvements may be used without others.

Having thus described my invention, I claim:—

1. In a computing machine, a register comprising a series of dials, a shield having a sight-opening exposing a line of figures from which results may be read, a signal, and means controlled by the dials for shifting said signal from a normal concealed position behind said shield to a display position between the edge of the sight-opening and the exposed row of digits when the result changes from positive to negative.

2. In a computing machine, a register comprising a series of dials, a shield having a sight-opening exposing a line of figures from which results may be read, a signal, and means controlled by the dials for shifting said signal from a normal concealed position behind said shield to a display position between the edge of the sight-opening and the exposed row of digits when the result changes from positive to negative, said signal bearing the inscription "credit balance".

3. In a computing machine, a register comprising a series of dials, computing mechanism for actuating said dials to effect addition or subtraction, and means controlled by said dials for varying the state of said computing mechanism.

4. In a combined typewriting and computing machine, means including numeral-keys for typing in a plurality of colors, a register comprising a series of dials, numeral-key-controlled computing means for actuating said dials, and means controlled by the dials for varying the color of typing and the state of said computing means.

5. In a combined typewriting and computing machine, means including numeral-keys for typing in a plurality of colors, a register comprising a series of dials, numeral-key-controlled computing means for actuating said dials, and means controlled by the dials for indicating the character of the result and varying both the color of typing and the state of said computing means.

6. In a combined typewriting and computing machine, means including numeral-keys for typewriting in a plurality of colors, a register comprising a series of dials, a dial operating mechanism therefor, numeral-type-key-controlled computing means for actuating said mechanism, and means controlled by the dial-operating mechanism for indicating the character of the result and varying the color of the typing.

7. In a combined typewriting and computing machine, means including numeral-keys for typing in a plurality of colors, a register comprising a series of dials, numeral-key-controlled computing means for actuating said dials, and means controlled by the dials for indicating the character of the result and varying the state of the computing means.

8. In a combined typewriting and computing machine, a carriage, a register, computing mechanism settable to different states, carriage-controlled means for setting said computing mechanism for subtraction when the carriage enters a predetermined computing zone, and register-controlled means for preventing setting of said computing mechanism by said carriage-controlled means.

9. In a combined typewriting and computing machine, a carriage, a register, computing mechanism settable to different states, carriage-controlled means for changing the state of said computing mechanism when the carriage enters a predetermined computing zone, and register-controlled means for preventing a change of state by said carriage-controlled means.

10. In a combined typewriting and computing machine, a carriage, a register, subtraction-setting mechanism, color-changing mechanism normally under the control of said subtraction-setting mechanism, carriage-controlled means for relieving the color-changing mechanism from control by the subtraction-setting mechanism, and register-controlled means actuable by said carriage for preventing actuation of said subtraction-setting mechanism.

11. In a combined typewriting and computing machine, a carriage, a register, subtraction-setting mechanism, color-changing mechanism normally under the control of said subtraction-setting mechanism, carriage-controlled means for relieving the color-changing mechanism from control by the subtraction-setting mechanism, and register-controlled means actuable by said relieving means for preventing actuation of said subtraction-setting mechanism.

12. In a combined typewriting and computing machine, a register, color-changing mechanism, state-changing mechanism, and means controlled by the register for automatically varying the setting of said color-changing mechanism and said state-changing mechanism.

13. In a combined typewriting and computing machine, a register, color-changing mechanism, state-changing mechanism, and means controlled by the register for automatically varying the setting of said state-changing mechanism.

14. In a combined typewriting and computing machine, a register comprising a series of dials, color-changing mechanism, state-changing mechanism, and means controlled by the dials for automatically varying the setting of said color-changing mechanism.

15. In a computing machine, a register comprising a series of rotatable dials, a shield having a sight-opening exposing a line of figures from which results may be read, a signal normally concealed behind said shield, and means actuable by the dial of highest denomination, in one direction of movement thereof, to shift the signal in the opposite direction to a display position at said sight-opening.

16. In a computing machine, a register comprising a series of number-wheels each having a carry-over tooth thereon, a pivotally-mounted arm actuable by the carry-over tooth of the wheel of highest order, a signal, and means operable by said arm to shift said signal to effective position without interfering with the reading of the number-wheels.

17. In a computing machine, a register comprising a series of number-wheels, a tooth on the number-wheel of highest order, a shield having a sight-opening to expose the results of computation, a signal normally concealed, signal-supporting arms mounted to turn about the axis of said number-wheels, and a device actuable by said tooth when the "9" on said wheel of highest order appears at said sight-opening, and comprising an arm having a pin-and-slot connection with one of the signal-supporting arms to shift the signal to a display position.

18. In a computing machine, a register comprising a series of number-wheels, a shield having a sight-opening through which a line of figures, showing the results of computation, is displayed, a normally-concealed signal to indicate a negative result, and means controlled by the number-wheel of highest order for displaying the signal when the result is negative without interfering with the reading of the number-wheels, thereby avoiding mistakes in determining the character of the result by inspection of the figures at the sight-opening.

19. In a combined typewriting and computing machine, a register, a carriage, color-changing mechanism, a device for actuating said color-changing mechanism, and carriage-operated means, rendered effective by said register in accordance with the character of the result in the register, for operating said actuating device for the color-changing mechanism.

20. In a combined typewriting and computing machine, a carriage, a register, subtraction-setting mechanism, color-controlling mechanism normally set for one color but shiftable by said subtraction-setting mechanism, and means controlled by said register to cause the color-controlling mechanism to be shifted by the carriage without actuation of the subtraction-setting mechanism.

21. In a combined typewriting and computing machine, a carriage, a register, subtraction-setting mechanism, color-controlling mechanism normally set for one color but shiftable by said subtraction-setting mechanism, carriage-actuated means for preventing shifting of said color-controlling mechanism by said subtraction-setting mechanism, and means controlled, as to effectiveness, by said register to cause said carriage-actuated means to shift said color-controlling mechanism.

22. In a combined typewriting and computing machine, a carriage, carriage-controlled means for setting said machine for subtraction, a key, and locking means actuable by said key, including a bail and a flexible member connected to the locking means, for preventing operation of said carriage-controlled means.

23. In a combined typewriting and computing machine, bichrome mechanism normally set for one color, and comprising a link to change the setting thereof, subtraction-setting mechanism, a plunger operable by said subtraction-setting mechanism, and underlying said link, a second plunger underlying said link, a key, and means actuable by said key, including a bail and a spring-pressed crank-arm, for actuating the second plunger to change the setting of the bichrome mechanism and reset the machine for addition, if set for subtraction.

24. In a combined typewriting and computing machine, a carriage, carriage-controlled means for setting said machine for subtraction, a key, a locking member to prevent operation of said carriage-controlled means, and means actuable by said key, including a bail and a flexible member connected to the locking member, to move said locking member to effective position and yield in case the machine is set for subtraction prior to the operation of said key.

25. In a combined typewriting and computing machine, a carriage, carriage-controlled means for setting said machine for subtraction, a key, a locking member to prevent operation of said carriage-controlled means, means actuable by said key, including a bail formed with an arm co-operating with a flexible member connected to the locking member, to move said locking member to effective position and yield in case the machine is set for subtraction prior to the operation of said key, and means actuable by said key to reset the machine for addition and to permit said locking member to become effective.

26. In a combined typewriting and computing machine, a register, a carriage, bichrome mechanism including a member for shifting the same, a second member reciprocable by said carriage, and means controlled by the register for connecting the second member to the first member to actuate the same.

27. In a combined typewriting and computing machine, a carriage, subtraction-setting mechanism, bichrome mechanism, a link for shifting the bichrome mechanism and normally actuable by said subtraction-setting mechanism, carriage-controlled means for displacing said link laterally to prevent operation thereof by the subtraction-setting mechanism, additional means for actuating said link to shift the bichrome mechanism, and means to connect said additional link-actuating means to the carriage-controlled-link-displacing means to be actuated thereby.

28. In a combined typewriting and computing machine, a carriage, computing mechanism, bichrome mechanism, carriage-controlled means for setting the machine for subtraction without shifting the bichrome mechanism, a key, means actuable by said key for resetting the machine for addition and shifting said bichrome mechanism, and carriage-actuated means rendered effective by a negative result to reset the machine for addition and to shift said bichrome mechanism without movement of said key.

29. In a computing machine including a frame, a register comprising a series of dials, a sight-opening in the frame to expose a line of numerals recorded on the dials, means to promote the reading of the record in denominational values, comprising a bar secured to the inside face of the frame adjacent the forward edge of the sight-opening, carrying a series of fingers arranged across the sight-opening at denominational intervals and curved to lie between adjoining dials flush with the faces thereof, and a signal operable by the dials to swing over the dials and fingers and under the sight-opening for exposure.

30. In a computing machine including a frame, a register comprising a series of dials, a sight-opening in the frame to expose a line of numerals recorded on the dials, and means to promote the reading of the record in denominational values, comprising a bar secured to the inside face of the frame adjacent the forward edge of the sight-opening, carrying a series of fingers arranged across the sight-opening at denominational intervals.

31. In a computing machine including a frame, a register comprising a series of dials, a sight-opening in the frame to expose a line of numerals recorded on the dials, means to promote the reading of the record in denominational values, comprising a bar secured to the inside face of the frame adjacent the forward edge of the sight-opening, carrying a series of fingers arranged across the sight-opening at denominational intervals close to the face of the dials, and a signal operated by the dials to move to the sight-opening to indicate a credit balance.

HENRY RESCH.